(12) United States Patent
Davis et al.

(10) Patent No.: US 10,370,993 B2
(45) Date of Patent: Aug. 6, 2019

(54) SLIDING SEAL

(71) Applicant: UNITED TECHNOLOGIES CORPORATION, Farmington, CT (US)

(72) Inventors: Timothy M. Davis, Kennebunk, ME (US); Paul M. Lutjen, Kennebunkport, ME (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 861 days.

(21) Appl. No.: 14/830,910

(22) Filed: Aug. 20, 2015

(65) Prior Publication Data

US 2016/0115814 A1   Apr. 28, 2016

Related U.S. Application Data

(60) Provisional application No. 62/068,519, filed on Oct. 24, 2014.

(51) Int. Cl.
*F16J 15/06* (2006.01)
*F01D 11/00* (2006.01)
(Continued)

(52) U.S. Cl.
CPC .......... *F01D 11/005* (2013.01); *F16J 15/061* (2013.01); *F16J 15/08* (2013.01); *F16J 15/104* (2013.01);
(Continued)

(58) Field of Classification Search
CPC ...... F01D 11/005; F01D 11/003; F01D 11/00;
F16J 15/061; F16J 15/08; F16J 15/104;
F16J 15/348; F16J 15/16; F16J 15/166;
F16J 15/32; F16J 15/3208; F16J 15/3216;
F16J 15/00; F05D 2220/32;
(Continued)

(56) References Cited

U.S. PATENT DOCUMENTS 3,068,016 A * 12/1962 Dega ................... C22C 32/0068
277/406
3,279,803 A   10/1966 Sekulich
(Continued)

FOREIGN PATENT DOCUMENTS

GB    2385643 A    8/2003

OTHER PUBLICATIONS

European Office Action for Application No. 15 190 612.0; dated Mar. 21, 2018.
(Continued)

*Primary Examiner* — Nathan Cumar
(74) *Attorney, Agent, or Firm* — Cantor Colburn LLP

(57) ABSTRACT

The present disclosure relates generally to a sliding seal between two components. The sliding seal includes a first seal section and an uncoupled second seal section which allows the first and second seal sections to move relative to one another during relative movement between the two components. A wave spring disposed between the first and second seal sections biases the first and second seal sections away from one another. A compliant seal is carried by the second seal section. Other combinations of seal sections, wave springs, and compliant seals are also disclosed.

20 Claims, 19 Drawing Sheets

(51) Int. Cl.
*F16J 15/34* (2006.01)
*F16J 15/08* (2006.01)
*F16J 15/10* (2006.01)

(52) U.S. Cl.
CPC ......... *F16J 15/348* (2013.01); *F05D 2220/32* (2013.01); *F05D 2240/55* (2013.01)

(58) Field of Classification Search
CPC ........... F05D 2240/55; F05D 2250/184; F05D 2220/00; F05D 2240/00; F05D 2250/00
USPC .......................................................... 277/591
See application file for complete search history.

(56) References Cited

U.S. PATENT DOCUMENTS

| | | | |
|---|---|---|---|
| 4,602,795 A * | 7/1986 | Lillibridge | F16J 15/0887 277/644 |
| 4,660,695 A * | 4/1987 | Fukatani | F16D 13/585 192/109 R |
| 4,783,085 A | 11/1988 | Wicks et al. | |
| 5,014,917 A | 5/1991 | Sirocky et al. | |
| 5,078,412 A * | 1/1992 | Baumgarth | F02K 1/805 239/127.1 |
| 7,121,790 B2 | 10/2006 | Fokine et al. | |
| 7,347,425 B2 | 3/2008 | James | |
| 8,651,497 B2 * | 2/2014 | Tholen | F01D 11/005 277/644 |
| 2009/0243228 A1 | 10/2009 | Heinemann et al. | |
| 2013/0113168 A1 | 5/2013 | Lutjen et al. | |
| 2013/0234407 A1* | 9/2013 | Parrish | F02K 1/004 277/650 |

OTHER PUBLICATIONS

European Search Report for Application No. 15190612.0; dated Feb. 25, 2016.

* cited by examiner

SLIDING SEAL

CROSS REFERENCE TO RELATED APPLICATION

This application claims the benefit of and incorporates by reference herein the disclosure of U.S. Ser. No. 62/068,519, filed Oct. 24, 2015.

TECHNICAL FIELD OF THE DISCLOSURE

The present disclosure is generally related to seals and, more specifically, to a sliding seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a space defined by first and second adjacent components disposed about an axial centerline is disclosed, the seal comprising: a first substantially C-shaped seal section including a first base and first and second legs extending from the first base and defining a first cavity; a second substantially C-shaped seal section including a second base and third and fourth legs extending from the second base and defining a second cavity, the second seal section at least partially disposed within the first cavity; a wave spring disposed within the first cavity between the first and second seal sections and operative to bias the first seal section away from the second seal section; and a compliant seal partially disposed within the second cavity; wherein the first and second seal sections are configured to move relative to one another.

In another embodiment, a seal for sealing a space defined by first and second adjacent components disposed about an axial centerline is disclosed, the seal comprising: a substantially L-shaped first seal section including a first base and a first leg extending from the first base; a substantially C-shaped second seal section including a second base and second and third legs extending from the second base and defining a cavity; a wave spring disposed between the first and second seal sections and operative to bias the first seal section away from the second seal section; and a compliant seal partially disposed within the cavity; wherein the first and second seal sections are configured to move relative to one another.

In another embodiment, a seal for sealing a space defined by first and second adjacent components disposed about an axial centerline is disclosed, the seal comprising: a first seal section including a first base and first and second legs extending from the first base, the first base including a first cavity formed therein; a substantially C-shaped second seal section including a second base and third and fourth legs extending from the second base and defining a second cavity; a wave spring disposed between the first and second seal sections and operative to bias the first seal section away from the second seal section; a first compliant seal partially disposed within the first cavity; and a second compliant seal partially disposed within the second cavity; wherein the first and second seal sections are configured to move relative to one another.

In another embodiment, a seal for sealing a space defined by first and second adjacent components disposed about an axial centerline is disclosed, the seal comprising: a seal section including a first base and first and second legs extending from the first base, the first base including a cavity formed therein; a wave spring disposed between the first seal section and the first component and operative to bias the first seal section toward the second component; and a compliant seal partially disposed within the cavity.

In another embodiment, a seal for sealing a space defined by first and second adjacent components disposed about an axial centerline is disclosed, the seal comprising: a seal section including a first base and first and second legs extending from the first base, the first base including a first cavity formed therein and the second leg including a second cavity formed therein; a wave spring disposed between the first seal sections and the first component and operative to bias the first seal section toward the second component; a first compliant seal partially disposed within the first cavity; and a second compliant seal partially disposed within the second cavity.

In another embodiment, a seal for sealing a space defined by first and second adjacent components disposed about an axial centerline is disclosed, the seal comprising: a substantially L-shaped first seal section including a first base and a first leg extending from the first base; a plurality of tabs extending from the first base, wherein the first base, the first leg, and the plurality of tabs defining a cavity; and a compliant seal partially disposed within the cavity.

In another embodiment, a seal for sealing a space defined by first and second adjacent components disposed about an axial centerline is disclosed, the seal comprising: a substantially C-shaped first seal section including a first base and first and second legs extending from the first base and defining a cavity; a compliant seal partially disposed within the cavity; a wave spring disposed within the cavity; a flat ring disposed between the compliant seal and the wave spring; wherein the wave spring is operative to bias the compliant seal away from the first seal section.

In another embodiment, a seal for sealing a space defined by first and second adjacent components disposed about an axial centerline is disclosed, the seal comprising: a seal section including a first base and a first leg extending from the first base, the first leg including a plurality of slots formed therein; and a wave spring disposed between the first seal section and the first component and operative to bias the first seal section toward the second component.

In another embodiment, a seal for sealing a space defined by first and second adjacent components disposed about an axial centerline is disclosed, the seal comprising: a seal section including a first base and a first leg extending from the first base; a wave spring disposed between the first seal section and the first component and operative to bias the first seal section toward the second component; a flat ring spacer disposed between the wave spring and the first component; and a plurality of tabs extending from the first base and over a radially outer portion of the wave spring.

In another embodiment, a seal for sealing a space defined by first and second adjacent components disposed about an axial centerline is disclosed, the seal comprising: a seal section including a first base and a first leg extending from the first base; a wave spring disposed between the first seal section and the first component and operative to bias the first seal section toward the second component; a flat ring spacer disposed between the wave spring and the first component; a plurality of first tabs extending from the first base and over a radially outer portion of the wave spring; and a plurality of second tabs extending from the flat ring spacer and over the radially outer portion of the wave spring.

In another embodiment, a seal for sealing a space defined by first and second adjacent components disposed about an axial centerline is disclosed, the seal comprising: a split hoop seal section including a first base and a first leg extending from the first base, wherein a gap is defined by the first base and the first leg; a wave spring disposed between the first seal section and the first component and operative to bias the first seal section toward the second component; a flat ring spacer disposed between the wave spring and the first component; a plurality of tabs extending from the first base and over a radially outer portion of the wave spring; and a bridging seal disposed over said gap.

In another embodiment, a seal for sealing a space defined by first and second adjacent components disposed about an axial centerline is disclosed, the seal comprising: a seal section including a first base and a first leg extending from the first base; a first wave spring disposed between the first seal section and the first component and operative to bias the first seal section toward the second component; a flat ring spacer disposed between the wave spring and the first component; and a second wave spring disposed between the first wave spring and the first component such that the first wave spring is biased radially inboard.

In another embodiment, a seal for sealing a space defined by first and second adjacent components disposed about an axial centerline is disclosed, the seal comprising: a seal section including a first base and first and second legs extending from the first base; a wave spring disposed between the first seal section and the first component and operative to axially bias the first seal section toward the second component and to bias the first seal section radially inboard; and a frustoconical spacer disposed between the wave spring and the first component.

In another embodiment, a system is disclosed, comprising: a first component including a first surface; a second component including a second surface, the second component disposed adjacent the first component and defining a seal cavity therebetween; wherein the first and second components are disposed about an axial centerline; and a seal disposed in the seal cavity, the seal including: a first substantially C-shaped seal section including a first base and first and second legs extending from the first base and defining a first cavity; a second substantially C-shaped seal section including a second base and third and fourth legs extending from the second base and defining a second cavity, the second seal section at least partially disposed within the first cavity; a wave spring disposed within the first cavity between the first and second seal sections and operative to bias the first seal section away from the second seal section; and a compliant seal partially disposed within the second cavity; wherein the first and second seal sections are configured to move relative to one another.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
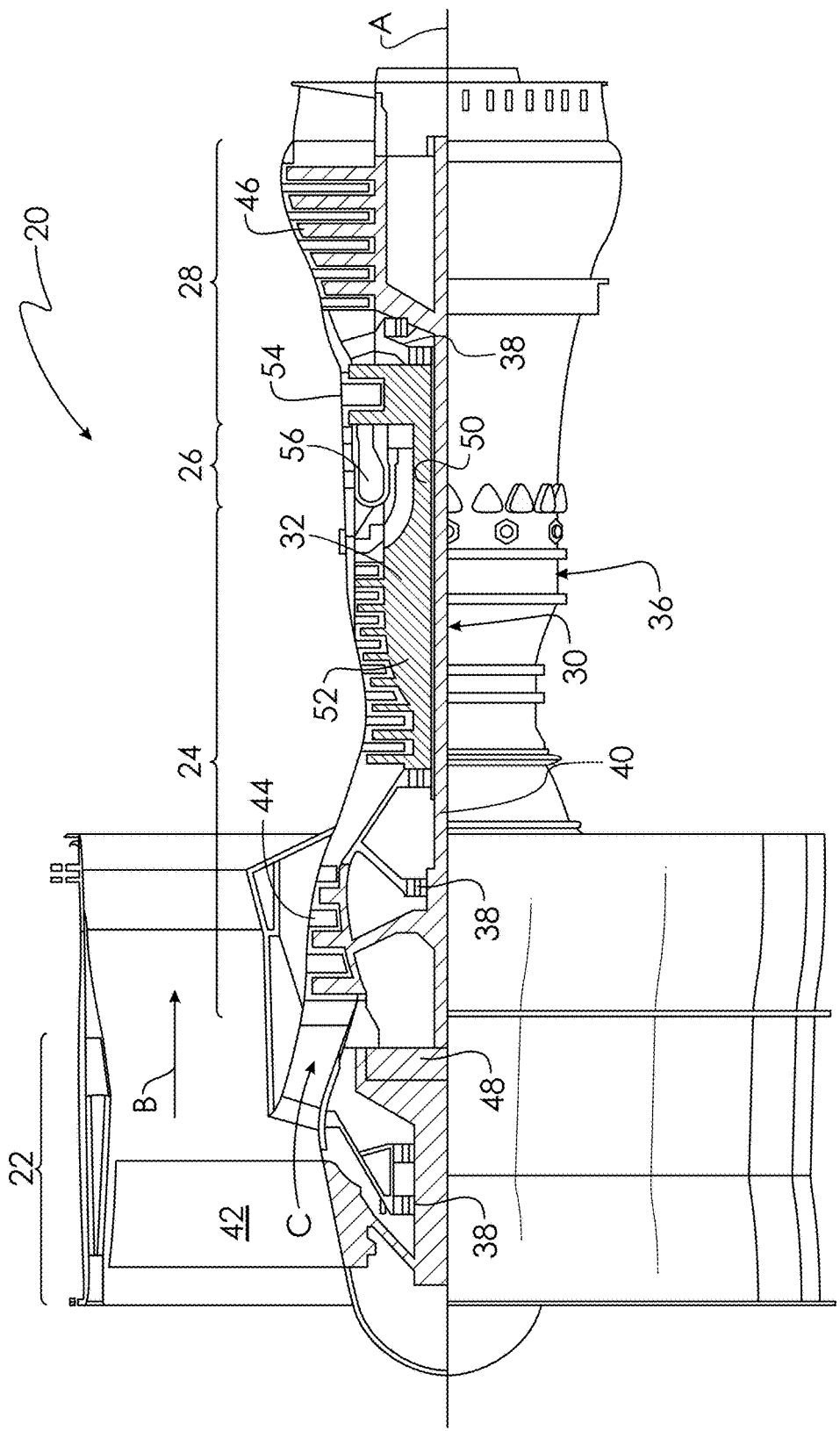
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

Figure 2:
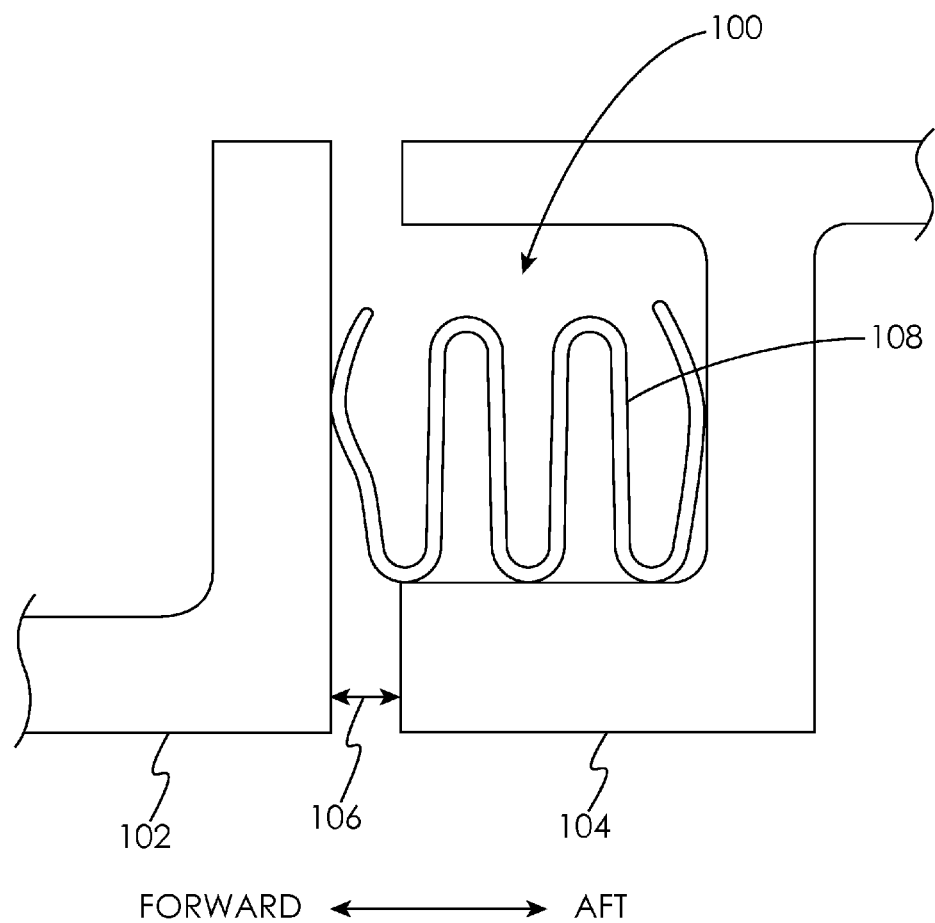
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop turbine components 102 and 104 which may move axially, radially, and circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies a w-seal 108 formed from a material appropriate to the anticipated operating conditions (e.g., deflection, temperature change, pressure, etc.) of the w-seal 108, such a nickel-base alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
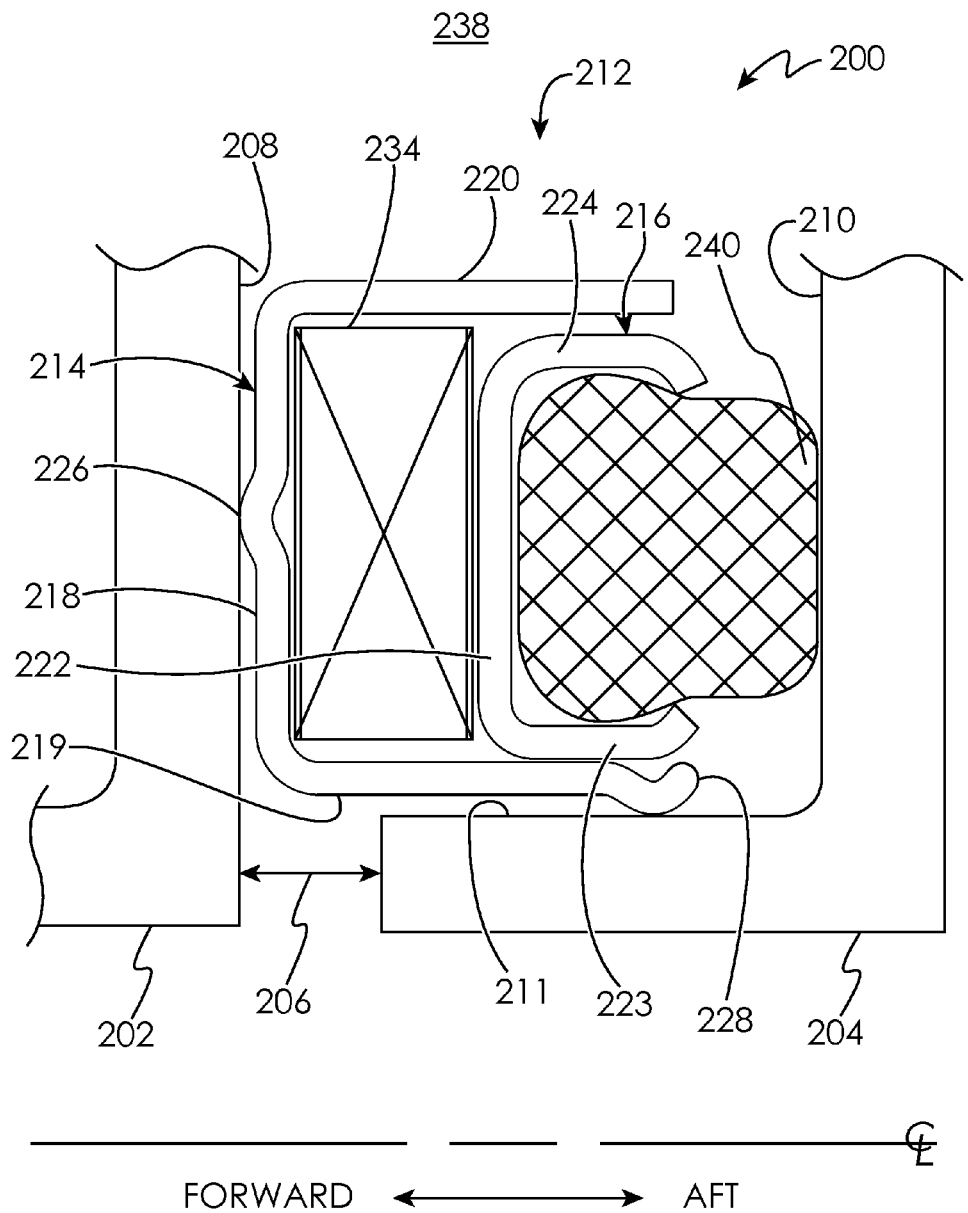
FIG. 3 is a schematic cross-sectional view of a seal and seal cavity in an embodiment.

FIG. 3 schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a surface 208 facing the seal cavity 200 and component 204 includes surfaces 210 and 211 facing the seal cavity 200. Within the seal cavity 200 lies a seal 212 formed from a material appropriate to the anticipated operating conditions of the seal 212, such as a high-temperature metal alloy, a high temperature ceramic material, a high temperature ceramic composite, or a combination of two or more of these, to name just a few non-limiting examples. The seal 212 is formed from a first seal section 214 and a second seal section 216. The first seal section 214 is generally C-shaped and includes a base 218, a major inboard leg 219 and a major outboard leg 220. The second seal section 216 is also generally C-shaped and includes a base 222, a minor inboard leg 223 and a minor outboard leg 224. As used herein, the term "major outboard leg" is intended to mean only that the leg is further outboard than the "minor outboard leg". Similarly, the term "major inboard leg" is intended to mean only that the leg is further inboard than the "minor inboard leg". The bases 218, 222 are oriented substantially radially, while the legs 219, 220, 223 and 224 are oriented substantially axially. The minor inboard leg 223 is supported by the major inboard leg 219. The seal 212 may include a coating and/or a sheath to provide increased wear resistance.

The base 218 includes a forward substantially rounded portion 226 in contact with the surface 208 such that the seal section 214 contacts the surface 208 along a single circumferential line of contact (in the case of full hoop components) or a single semi-circumferential line of contact (in the case of split hoop components). As used herein, the phrases "circumferential line of contact" and "semi-circumferential line of contact" include lines with a nominal radial or axial thickness. The seal section 214 also includes an aft substantially rounded end 228 in contact with the seal section the surface 211 such that the seal section 214 contacts the surface 211 along a single circumferential line of contact (in the case of full hoop components) or a single semi-circumferential line of contact (in the case of split hoop components).

Figure 4:
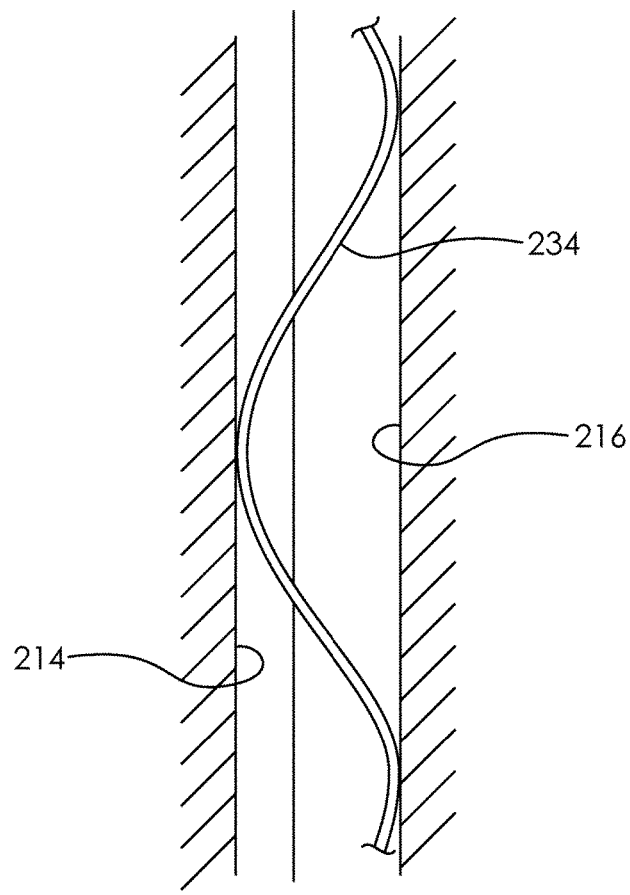
FIG. 4 is a schematic plan view of a wave spring in an embodiment.
Figure 5:
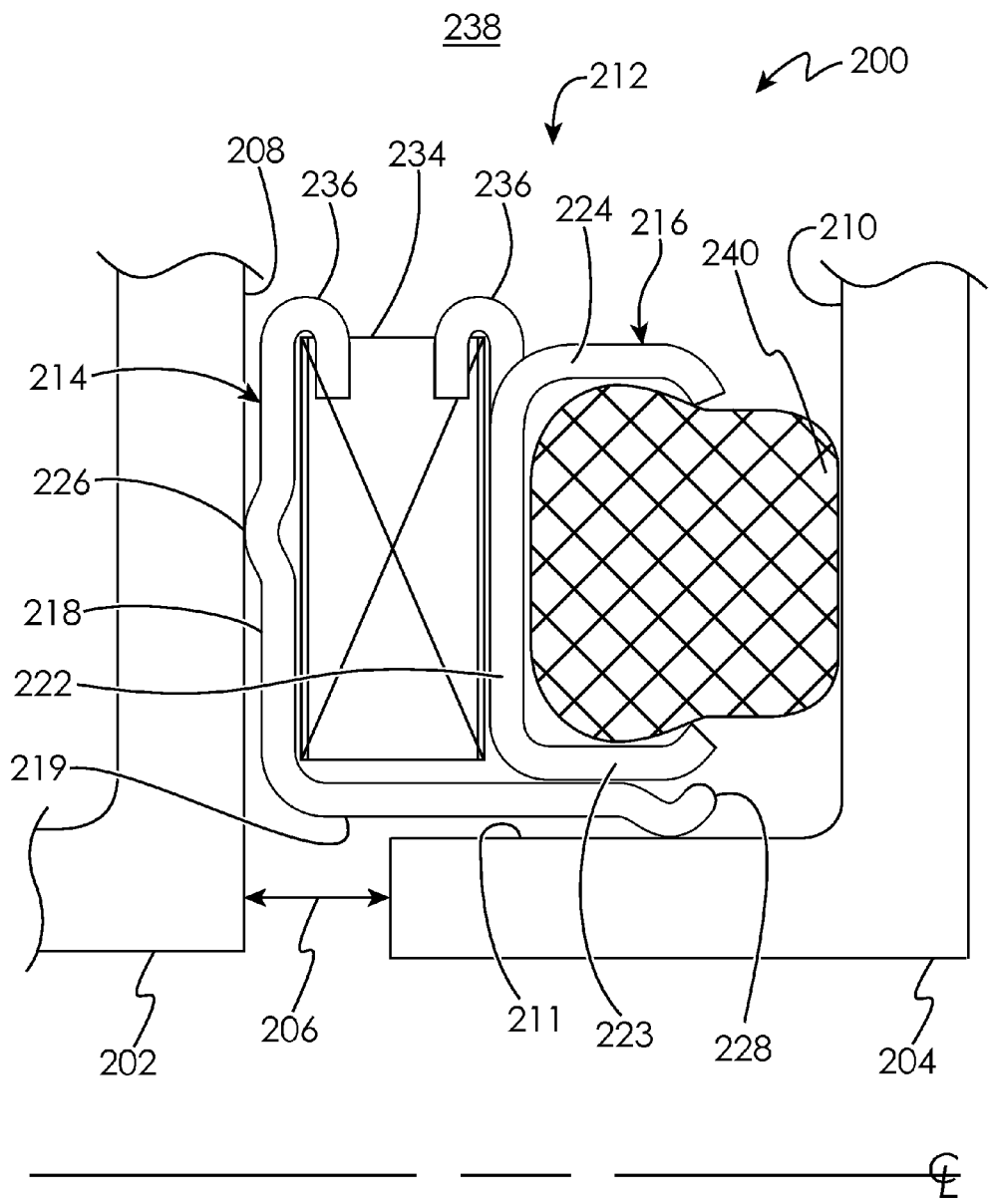
FIG. 5 is a schematic cross-sectional view of a seal and seal cavity in an embodiment.

A split hoop wave spring 234 is disposed within the cavity defined by the base 218, major inboard leg 219 and major outboard leg 220 of the seal section 214, as well as the base 222 of the seal section 216 in the embodiment of FIG. 3. A plan view of a portion of the wave spring 234 is illustrated in FIG. 4. In the embodiment of FIG. 5, the seal section 214 does not include the major outboard leg 220, and the seal sections 214, 216 include a plurality of tabs 236 spaced around their radially outer circumference. The tabs 236 wrap over the radially outer edge of the wave spring 234, thereby securing the wave spring 234 within the cavity defined by the base 218 and major inboard leg 219 of the seal section 214 and the base 222 of the seal section 216. When both the seal section 214 and the seal section 216 include tabs 236, the seal 212 comprises a discrete assembly that may be handled and installed as a single piece.

The seal 212 may include a full hoop high-temperature and compliant seal 240, such as a woven or braided ceramic rope seal or flat fabric (for example, NEXTEL ceramic textile available from The 3M Company of Maplewood, Minn. USA, to name just one non-limiting example) to partially seal stair-stepped gaps typical of segmented part interfaces of the component 204. The legs 223, 224 of the seal section 216 mechanically trap the compliant seal 240 while exposing enough of the compliant seal 240 to allow it to conform to the surface 210 of the component 204.

Pressure in a secondary flow cavity 238 is transmitted to the seal cavity 200 through an opening defined by the components 202, 204. This pressure acts upon the surfaces of the seal sections 214, 216, thereby causing the base 218 to seat against the surface 208 of the component 202, the compliant seal 240 to seat against the surface 210 of the component 204, the minor inboard leg 223 to seat against the major inboard leg 219, and the major inboard leg 219 to seat against the surface 211 of the component 204. The load applied by minor inboard leg 223 to the major inboard leg 219 helps the major inboard leg 219 to seat against the surface 211, thereby providing a secondary seal against flow that may leak past the compliant seal 240/surface 210 interface and legs 219, 223, such as during engine start-up, for example. This prevents most or all of the secondary flow cavity 238 gases from reaching the design clearance 206 area and flow path. As the two components 202 and 204 move relative to each other in the axial and/or radial direction, the seal sections 214, 216 are free to slide relative to one another in the axial and circumferential directions while the pressure forces acting upon the surfaces of the seal sections 214, 216 load the seal 212 so that it remains in contact with both components 202 and 204 as shown. Therefore, sealing is maintained while the components 202 and 204 and the components of the seal 212 move relative to one another. Because the seal sections 214, 216 slide with respect to one another and with respect to the components 202, 204, the seal 212 is not substantially deflected by the relative movement between the components 202 and 204.

Furthermore, the circumferentially-oriented wave spring 234 pushes the seal section 214 to remain in contact with the forward wall 208, and also pushes the seal section 216/compliant seal 240 to remain in contact with the aft wall 210 when the cavity 200 is not pressurized. This prevents the seal 212 from being damaged during transportation and installation, and also ensures that the seal 212 is instantly and positively pressurized/pressure-energized at engine start-up. Seal section 216 is split at one circumferential location to enable pressure to load the seal section 216 radially inward against the seal section 214. Seal section 214 may also optionally be split to create an additional sealing surface at the bottom of the seal cavity 200, as well as allowing the seal 212 to be packaged within a smaller radial design space. Leakage can be reduced significantly at the split location of each seal section 214, 216 by off-setting one split relative to the other, and further reduced by adding a sliding bridge to the cover the gap in the radially outer seal section 214.

Figure 6:
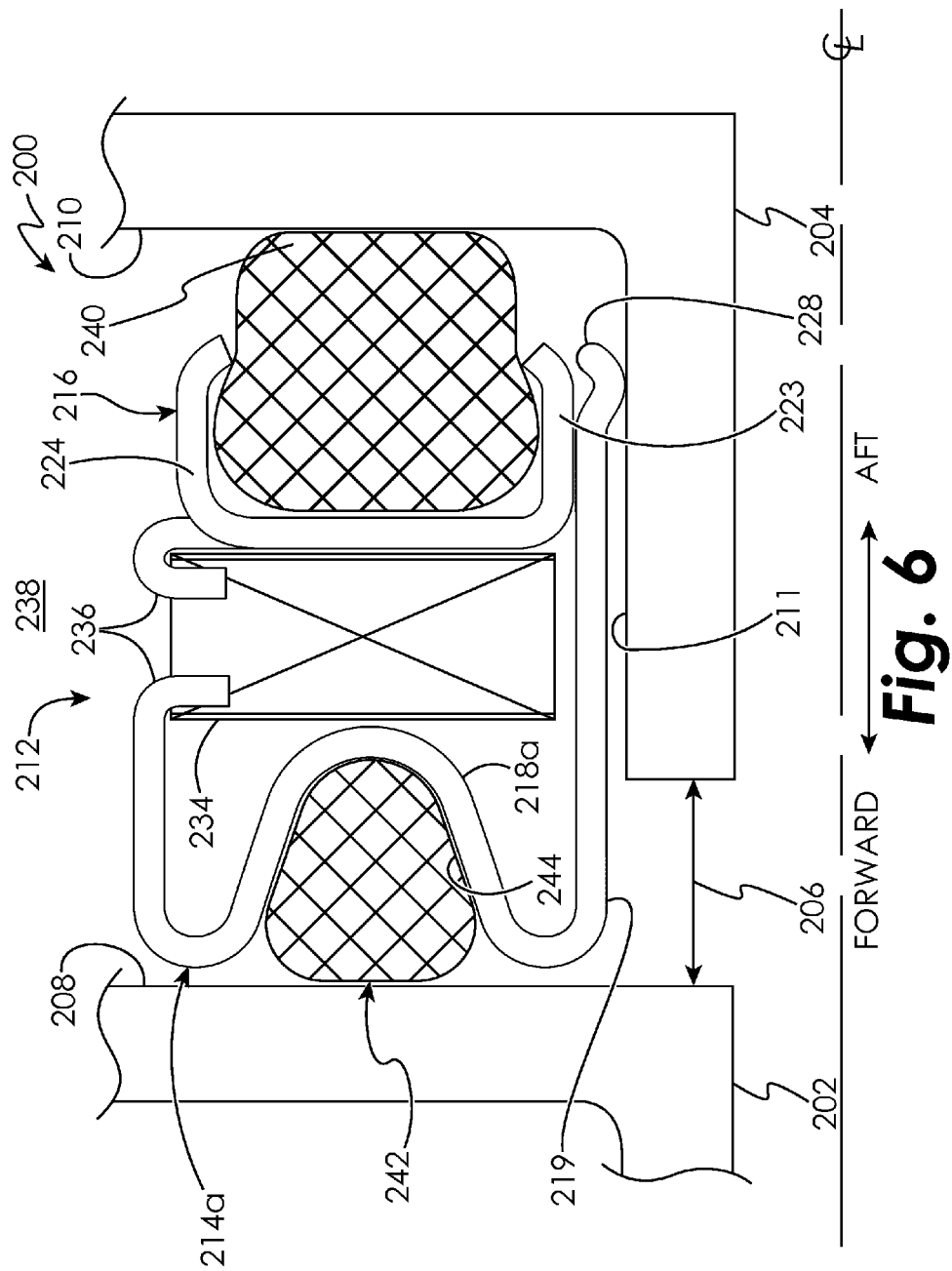
FIG. 6 is a schematic cross-sectional view of a seal and seal cavity in an embodiment.
Figure 7:
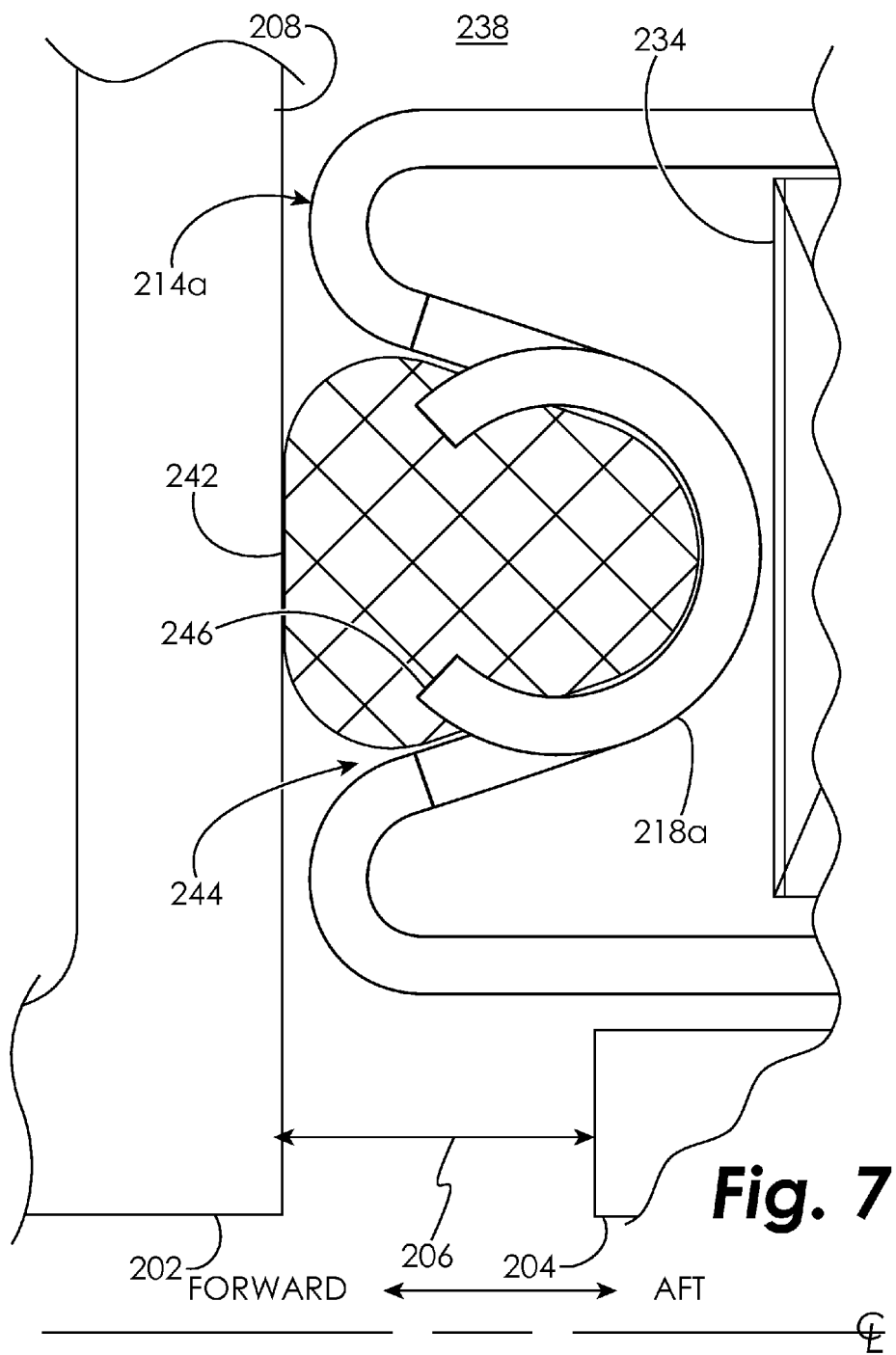
FIG. 7 is a schematic cross-sectional view of a portion of the seal of FIG. 6.

In the embodiment of FIG. 6, the seal 212 may include a second full hoop high-temperature and compliant seal 242, such as a woven or braided ceramic rope seal or flat fabric (for example, NEXTEL ceramic textile available from The 3M Company of Maplewood, Minn. USA, to name just one non-limiting example) to partially seal stair-stepped gaps typical of segmented part interfaces of the component 202 in some embodiments. The compliant seal 242 may be disposed between the base 218a and the surface 208 of the component 202 by providing a cavity 244 in the base 218a in which the compliant seal 242 may be retained in an embodiment. The compliant seal 242 may be mechanically attached to the seal section 214 by means of features 246 punched out of the base 218 as shown in FIG. 7. The compliant seals 240, 242 add compliance to the seal 212 in the axial direction.

Figure 8:
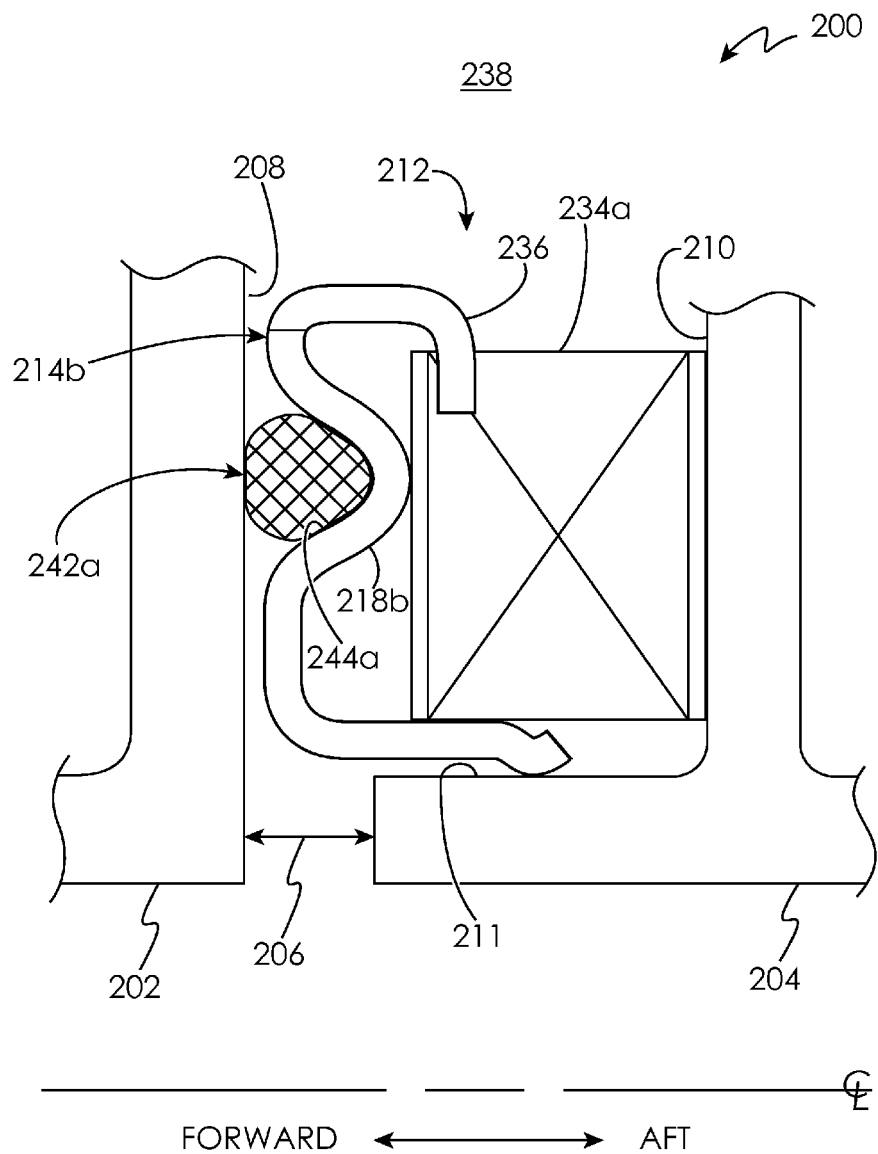
FIG. 8 is a schematic cross-sectional view of a seal and seal cavity in an embodiment.

In the embodiment of FIG. 8, the seal 212 may include a full hoop or split hoop high-temperature and compliant seal 242a, such as a woven or braided ceramic rope seal or flat fabric (for example, NEXTEL ceramic textile available from The 3M Company of Maplewood, Minn. USA, to name just one non-limiting example), carried by a split hoop seal section 214b to partially seal stair-stepped gaps typical of segmented part interfaces of the component 202 in some embodiments. The compliant seal 242a may be disposed between the base 218b and the surface 208 of the component 202 by providing a cavity 244a in the base 218b in which the compliant seal 242a may be retained in an embodiment. The compliant seal 242a may be mechanically attached to the seal section 214b by means similar to features 246 punched out of the base 218 as shown in FIG. 7. A wave spring 234a is disposed between the seal section 214b and the component 204 and biases the seal section 214b toward the surface 208 of the component 202. The compliant seal 242a adds compliance to the seal 212 in the axial direction.

Figure 9:
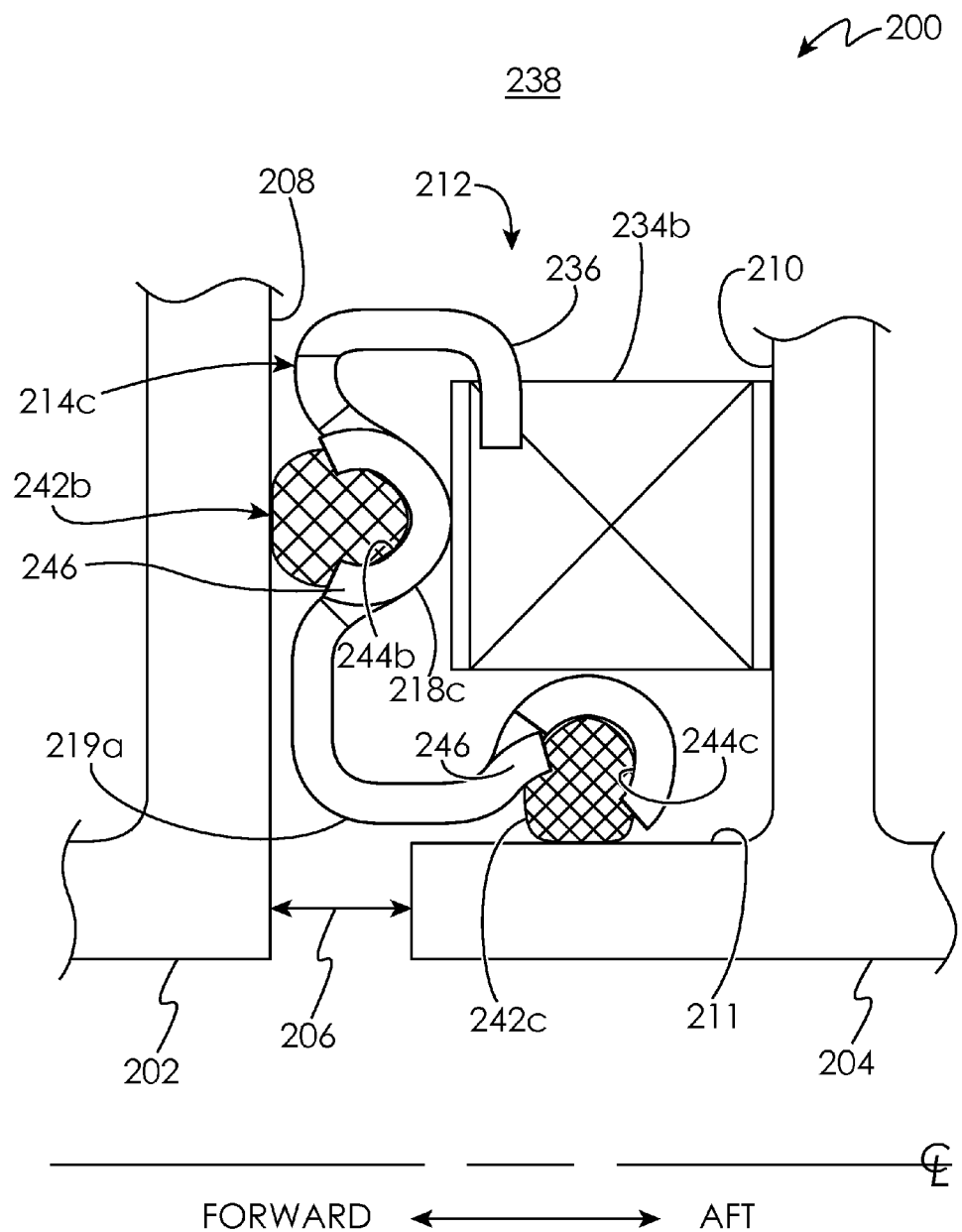
FIG. 9 is a schematic cross-sectional view of a seal and seal cavity in an embodiment.

In the embodiment of FIG. 9, the seal 212 may include a full hoop or split hoop high-temperature and compliant seal 242b, such as a woven or braided ceramic rope seal or flat fabric (for example, NEXTEL ceramic textile available from The 3M Company of Maplewood, Minn. USA, to name just one non-limiting example), carried by a split hoop seal section 214c to partially seal stair-stepped gaps typical of segmented part interfaces of the component 202 in some embodiments. The compliant seal 242b may be disposed between the base 218c and the surface 208 of the component 202 by providing a cavity 244b in the base 218c in which the compliant seal 242b may be retained in an embodiment. The seal 212 may further include a full hoop or split hoop high-temperature and compliant seal 242c, such as a woven or braided ceramic rope seal or flat fabric (for example, NEXTEL ceramic textile available from The 3M Company of Maplewood, Minn. USA, to name just one non-limiting example), carried by the split hoop seal section 214c to partially seal against the component 204 in some embodiments. The compliant seal 242c may be disposed between the major inboard leg 219a and the surface 211 of the component 204 by providing a cavity 244c in the major inboard leg 219a in which the compliant seal 242c may be retained in an embodiment. The compliant seals 242b and 242c may be mechanically attached to the seal section 214c by means of features 246 punched out of the base 218c and major inboard leg 219a. A wave spring 234b is disposed between the seal section 214c and the component 204 and biases the seal section 214c toward the surface 208 of the component 202. The compliant seal 242b adds compliance to the seal 212 in the axial direction, while the compliant seal 242c adds compliance to the seal 212 in the radial direction.

Figure 10:
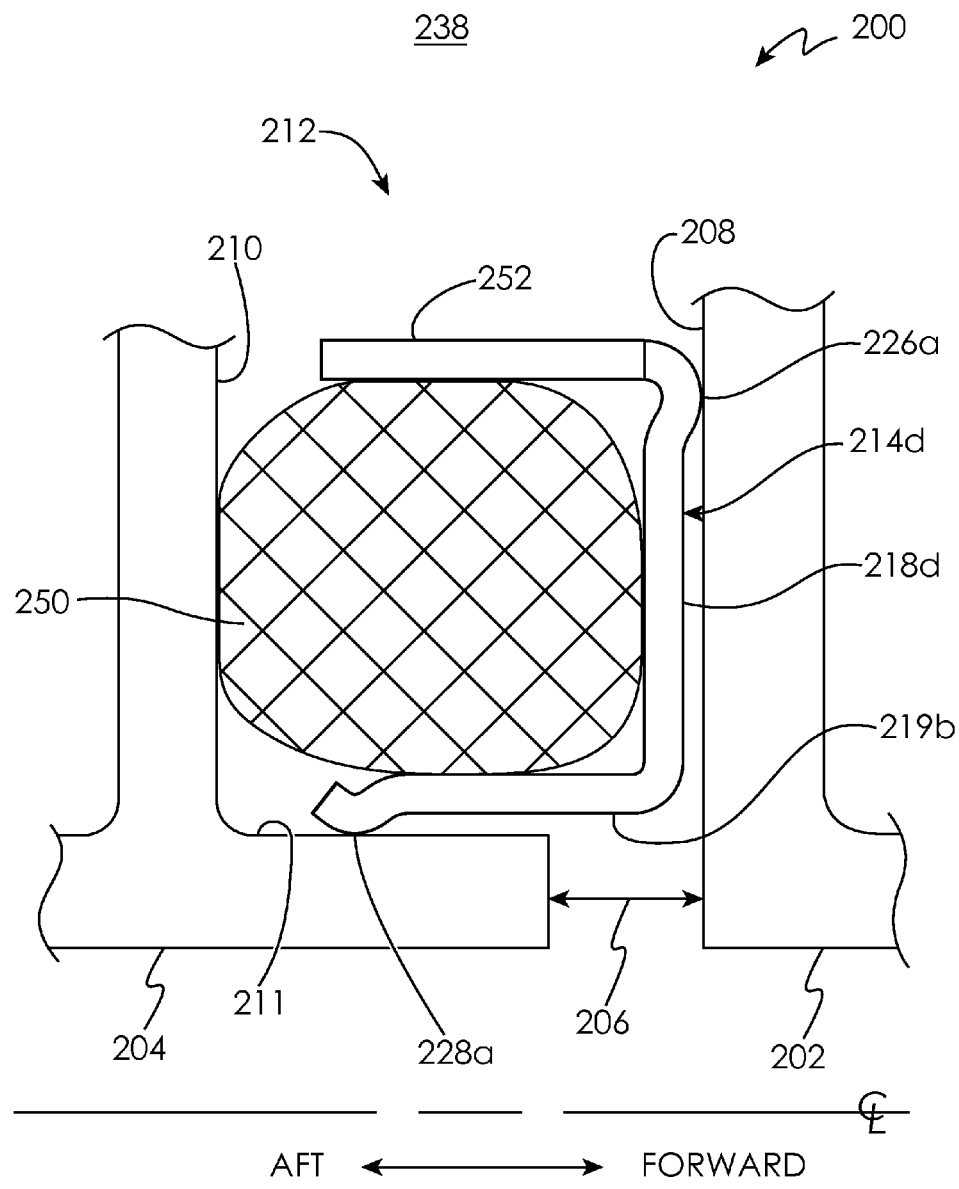
FIG. 10 is a schematic cross-sectional view of a seal and seal cavity in an embodiment.

In the embodiment of FIG. 10, the seal 212 is formed from a seal section 214d that is generally L-shaped and includes a base 218d and a major inboard leg 219b. The base 218d is oriented substantially radially, while the major inboard leg 219b is oriented substantially axially. The base 218d includes a forward substantially rounded portion 226a in contact with the surface 208 such that the seal section 214d contacts the surface 208 along a single circumferential line of contact (in the case of full hoop components) or a single semi-circumferential line of contact (in the case of split hoop components). The seal section 214d also includes an aft substantially rounded end 228a in contact with the surface 211 such that the seal section 214d contacts the surface 211 along a single circumferential line of contact (in the case of full hoop components) or a single semi-circumferential line of contact (in the case of split hoop components).

The seal 212 may include a split hoop high-temperature and compliant seal 250, such as a woven or braided ceramic rope seal or flat fabric (for example, NEXTEL ceramic textile available from The 3M Company of Maplewood, Minn. USA, to name just one non-limiting example) to partially seal stair-stepped gaps typical of segmented part interfaces of the component 204. The seal section 214d includes a plurality of tabs 252 spaced around the radially outer circumference of seal section 214d. The tabs 252 wrap over the radially outer edge of the compliant seal 250, thereby securing the compliant seal 250 within the cavity defined by the base 218d, major inboard leg 219a, and the tabs 252, while allowing limited outward expansion of the compliant seal 250 for increased resilience thereof. The splits in the seal section 214d and the compliant seal 250 may be offset to minimize leakage, and/or a bridge seal may be disposed over the gaps.

Figure 11:
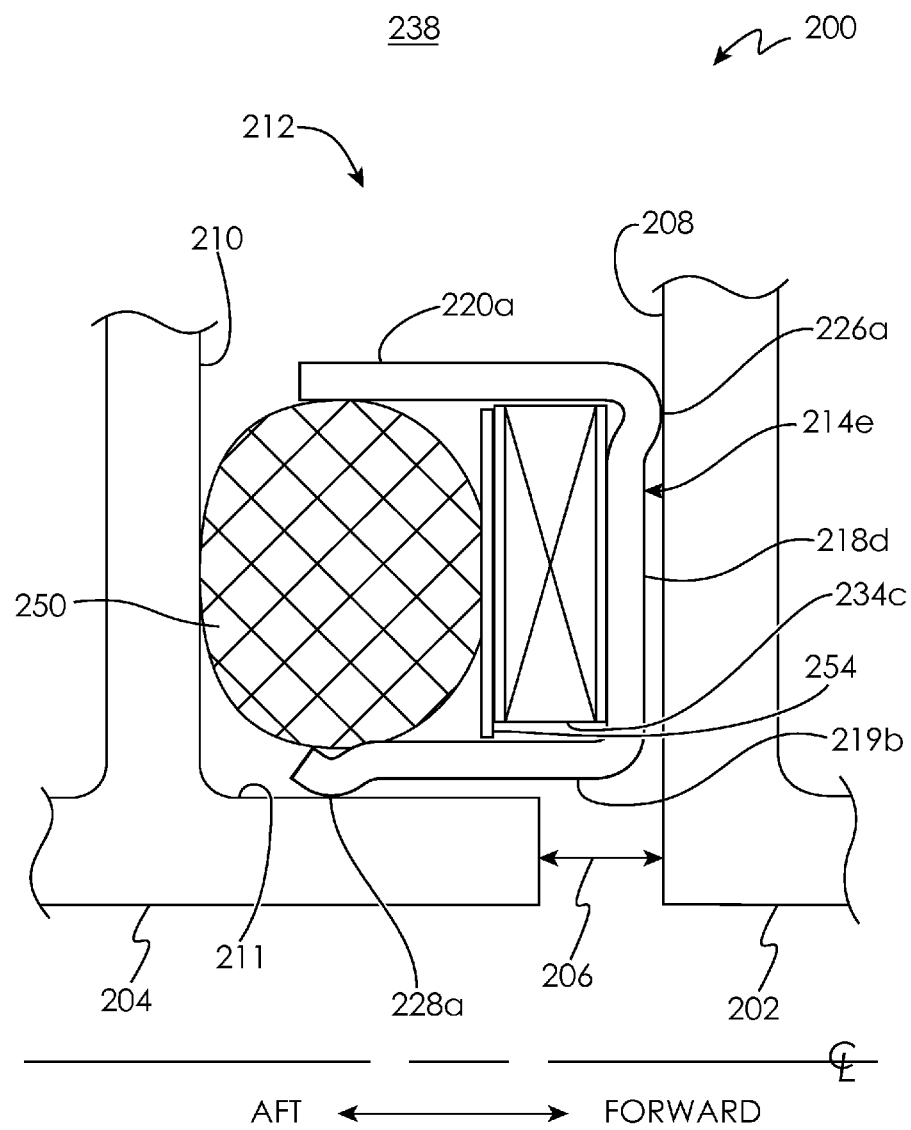
FIG. 11 is a schematic cross-sectional view of a seal and seal cavity in an embodiment.
Figure 12:
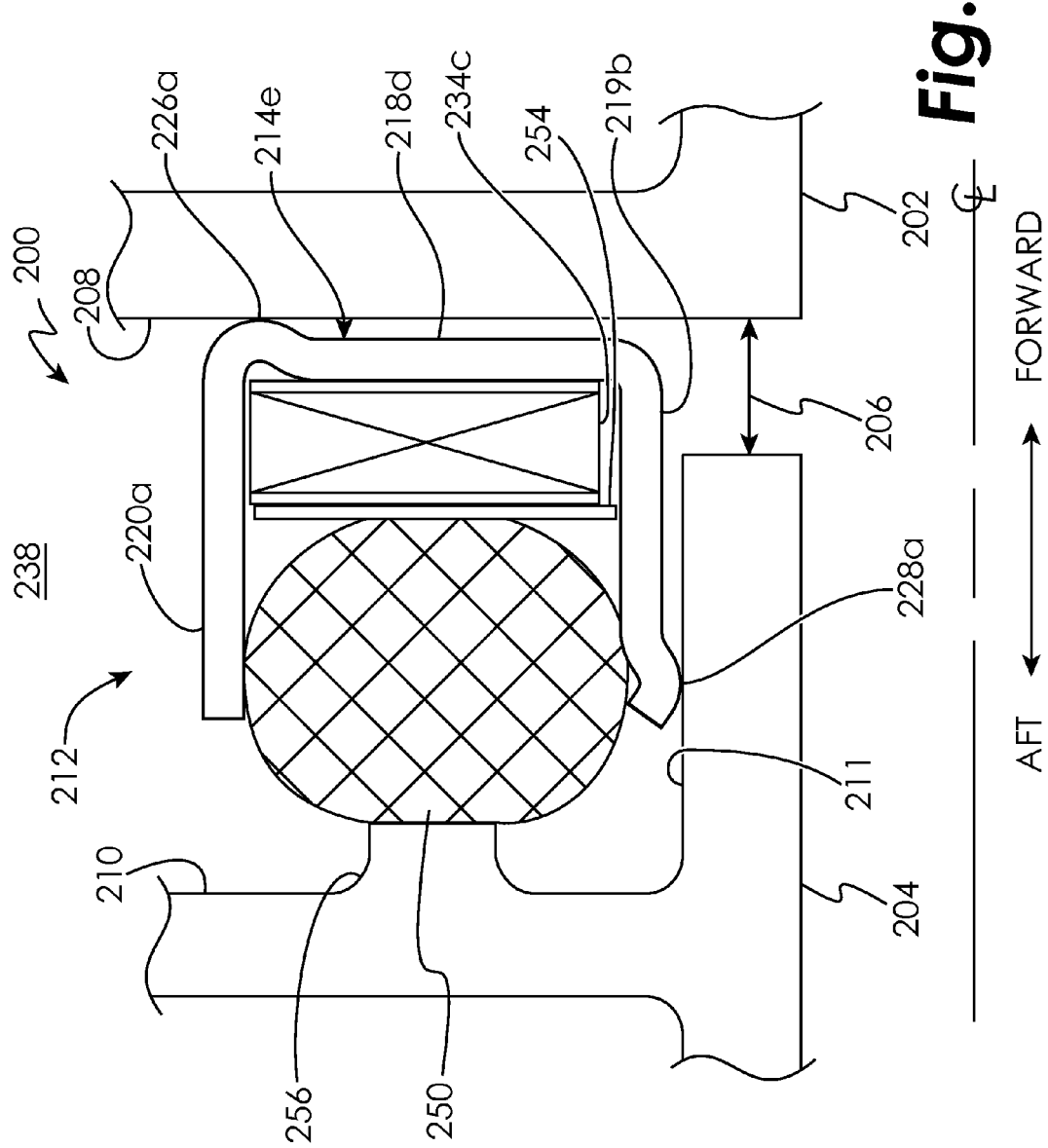
FIG. 12 is a schematic cross-sectional view of a seal and seal cavity in an embodiment.

The embodiment of FIG. 11 is similar to the embodiment of FIG. 10. The seal section 214e includes a continuous (except at the split location) major outboard leg 220a or a series of tabs 252. A wave spring 234c and optionally a flat ring 254 are disposed between the compliant seal 250 and the seal section 214e. Sealing between the major outboard leg 220a and the compliant seal 250 reduces leakage through the split in the seal section 214e, and resilience is not required from the compliant seal 250 because it is provided by the wave spring 234c. In the embodiment of FIG. 12, an axially-extending protrusion is disposed on surface 210 of component 204 to allow the legs 219b and 220a to extend further toward the component 204 to allow additional sliding length for the compliant seal 250.

Figure 13:
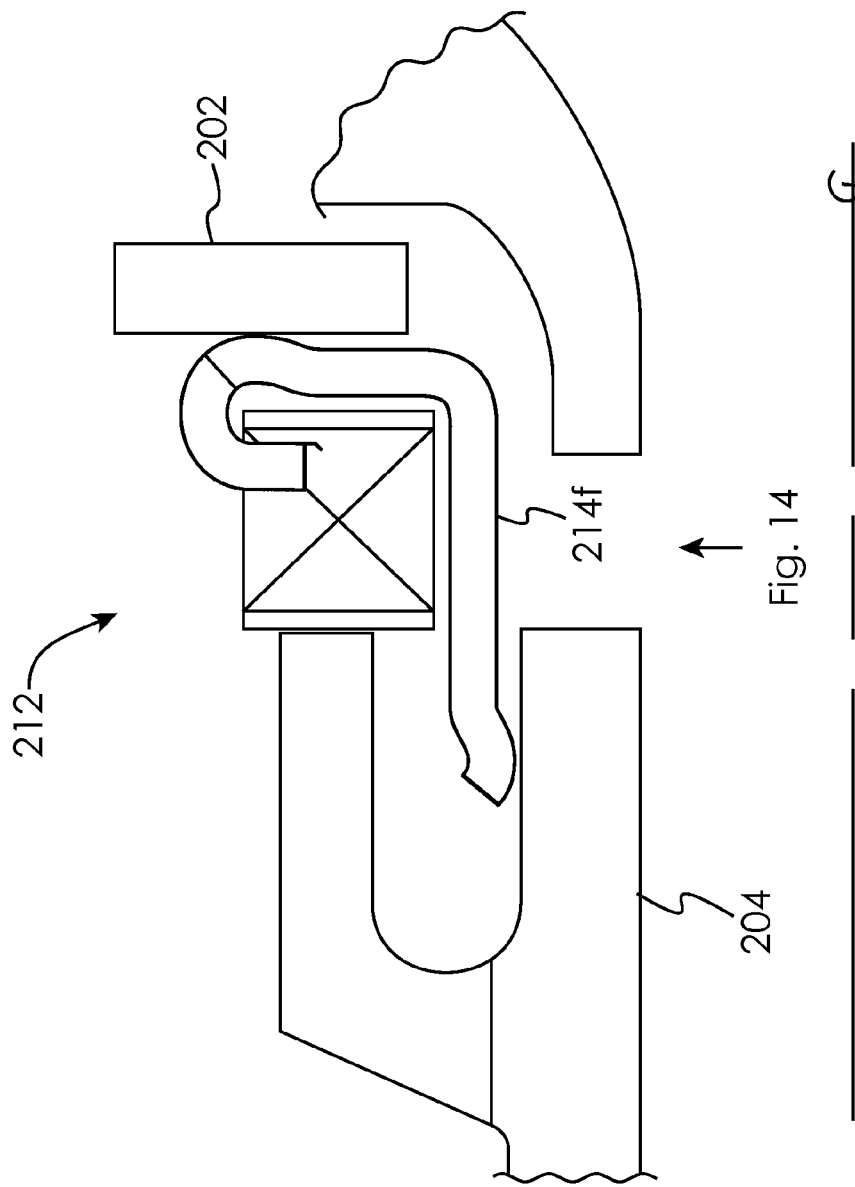
FIG. 13 is a schematic cross-sectional view of a seal and seal cavity in an embodiment.
Figure 14:
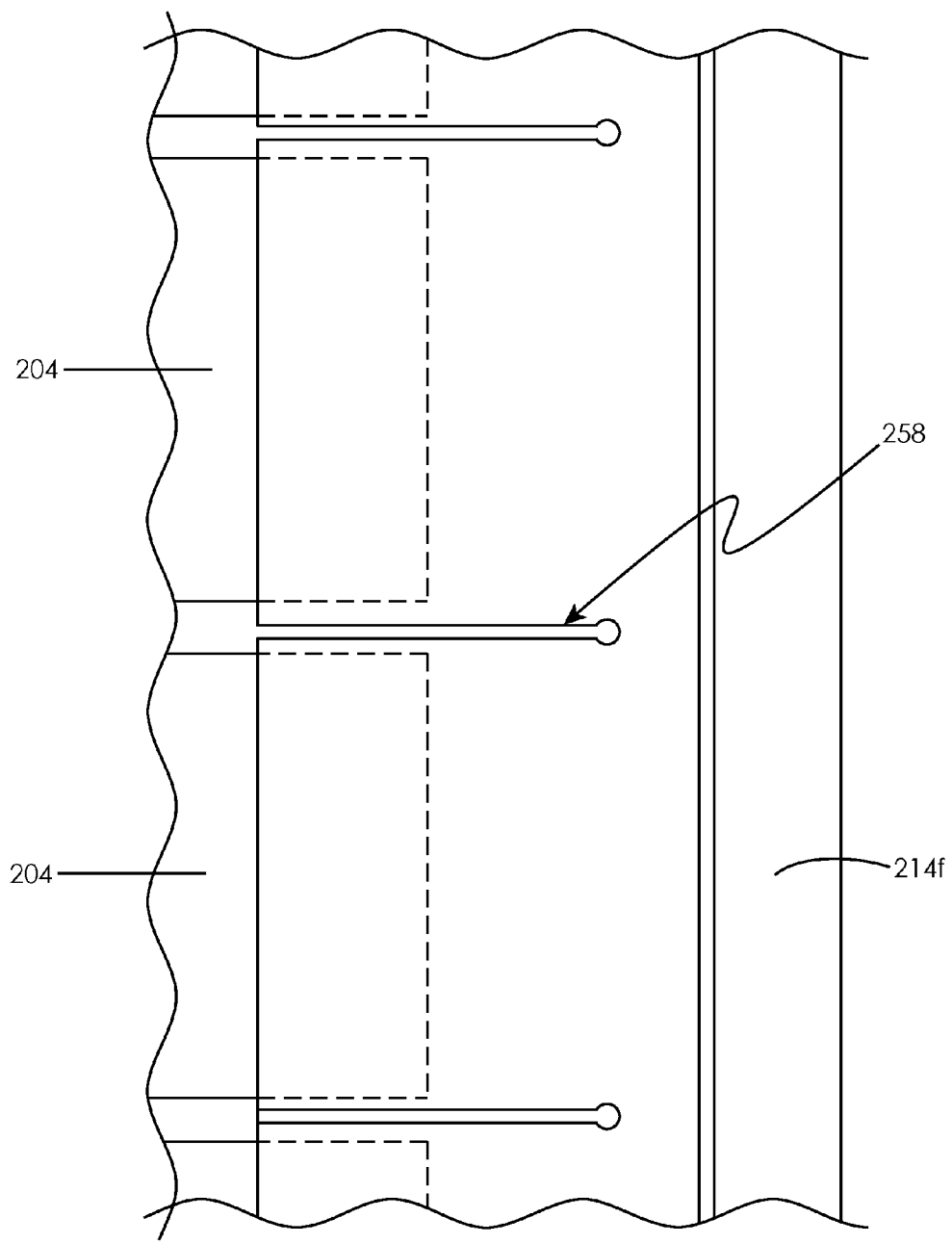
FIG. 14 is a schematic plan view of a portion of the seal of FIG. 13.

The embodiment of FIGS. 13 and 14 illustrates a seal section 214f in contact with components 202 and 204. Because the component 204 is segmented, there may be radial offsets between adjacent segments of the component 204. In order to ensure better sealing between the seal section 214f and the segmented component 204, the seal section 214f may include a plurality of slots 258 formed therein to allow the seal section 214f to better conform to the stair-stepped surface of the component 204. Provision of a plurality of slots 258 may be made in any of the embodiments disclosed herein.

Figure 15:
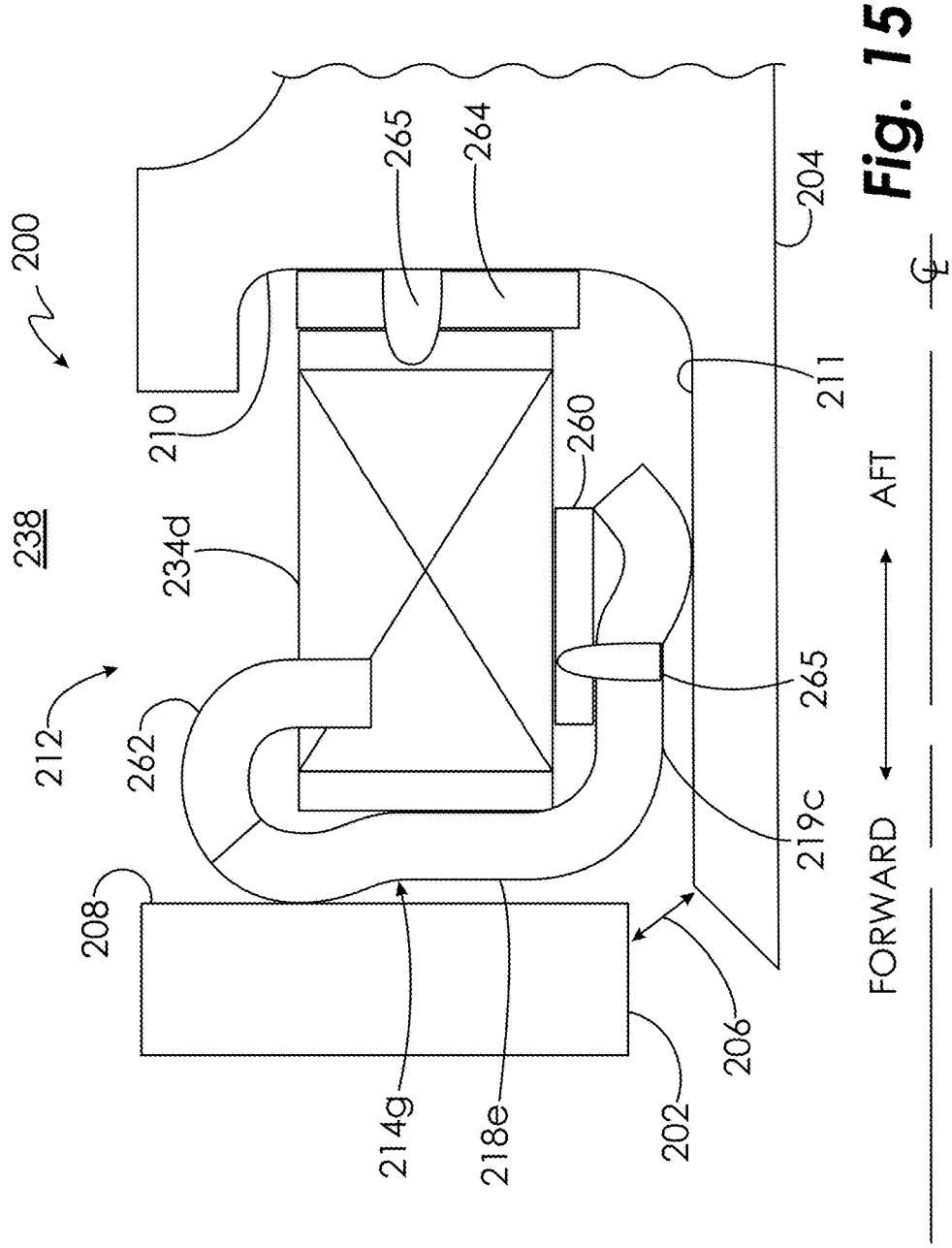
FIG. 15 is a schematic cross-sectional view of a seal and seal cavity in an embodiment.
Figure 16:
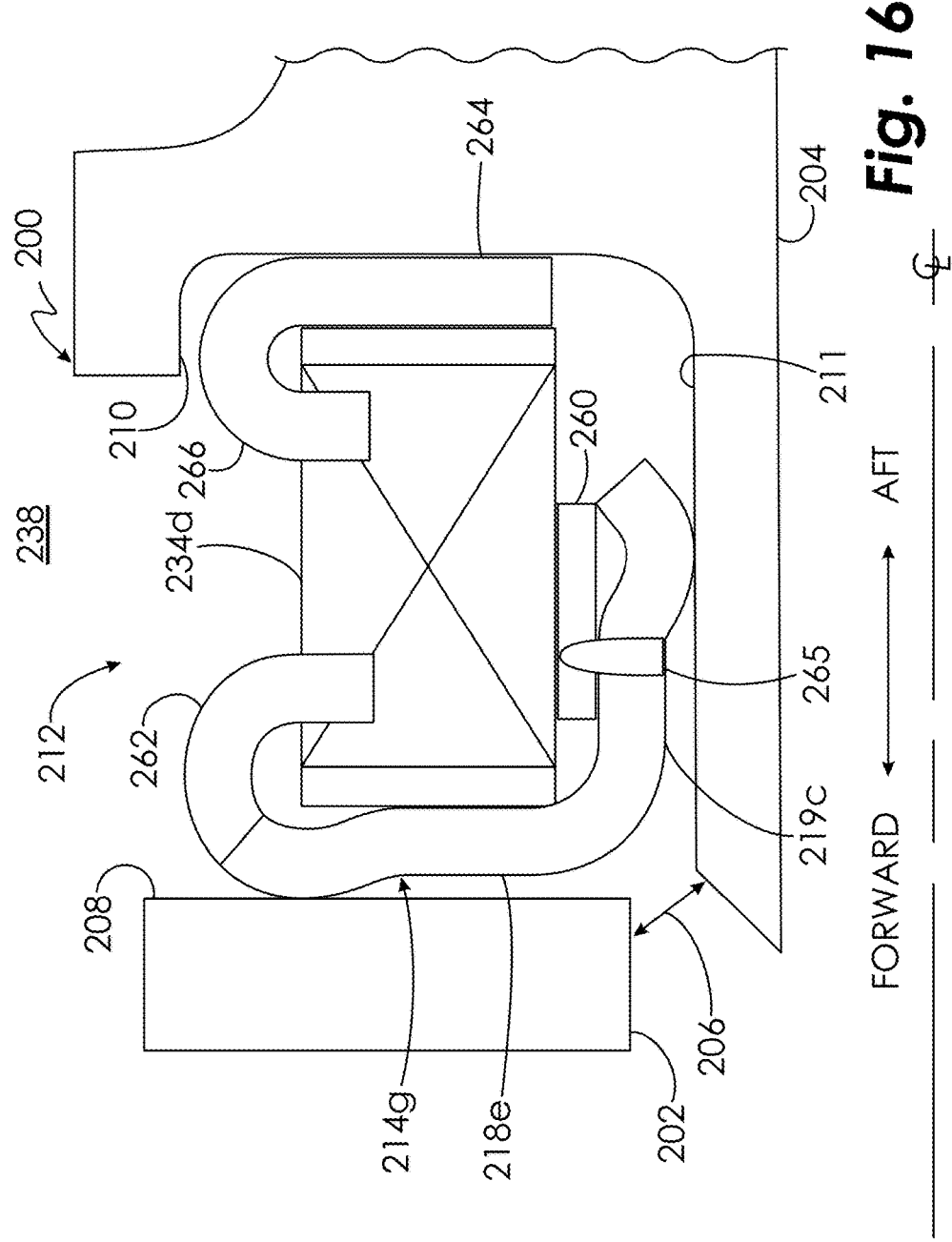
FIG. 16 is a schematic cross-sectional view of a seal and seal cavity in an embodiment.
Figure 17:
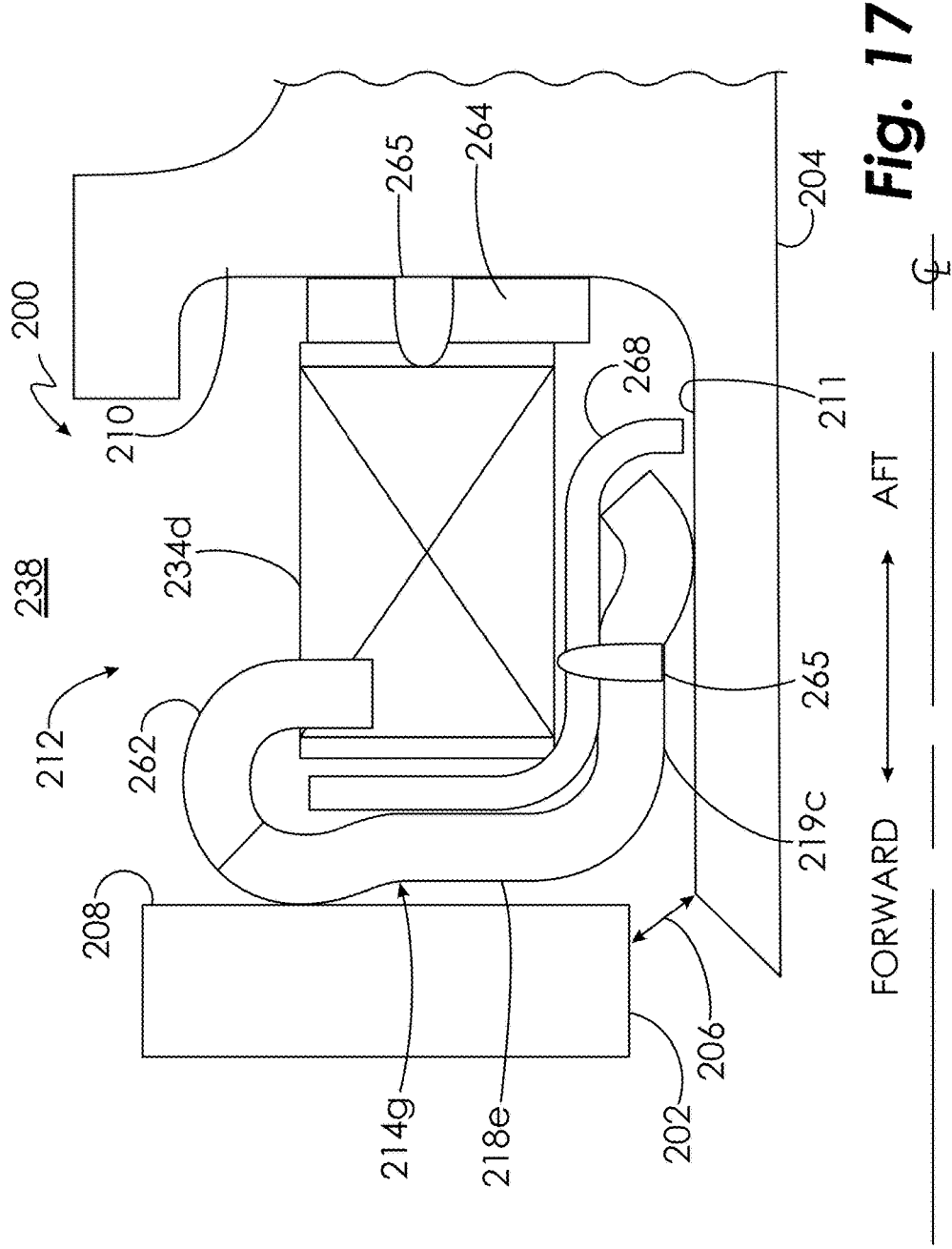
FIG. 17 is a schematic cross-sectional view of a seal and seal cavity in an embodiment.

In the embodiment of FIG. 15, a seal section 214g is in contact with components 202, 204. The seal section 214g includes a base 218e and a major inboard leg 219c. An optional spacer 260 may be disposed on the major inboard leg 219c and optionally bonded to the major inboard leg 219c at a plurality of circumferential locations by any desired means, such as by laser welds or resistance welds 265 to name just two non-limiting examples. A wave spring 234d is disposed on the spacer 260, thus the spacer 260 radially lifts the wave spring 234d. The wave spring 234d may be retained by a plurality of tabs 262 disposed around the circumference of the seal section 214g. A shield 264 contacts the wave spring 234d axially opposite the seal section 214g. The shield 264 may be bonded to the wave spring 234d by any desired means, such as by a laser weld or resistance weld 265, to name just two non-limiting examples, placed approximately 180 degrees from a split location of the wave spring 234d to allow the wave spring 234d and shield 264 to grow freely relative to one another in the circumferential direction. The shield 264 may be made from a low-strength, high-temperature and lubricious material to provide wear protection to the wave spring 234d against rubbing and point contact against stair-stepped edges of the segments of the component 204. The shield 264 may also provide thermal shielding and potentially improved sealing. In the embodiment of FIG. 16, the shield 264 is maintained in contact with the wave spring 234d by means of an extension 266 that loops over the wave spring 234d. As shown in FIG. 17, a bridging seal 268 may be positioned over the split in seal section 214g and mechanically attached to one side of the gap, with the other end of the bridging seal 268 free to slide in response to differential thermal movement between the seal section 214g and the bridging seal 268.

Figure 18:
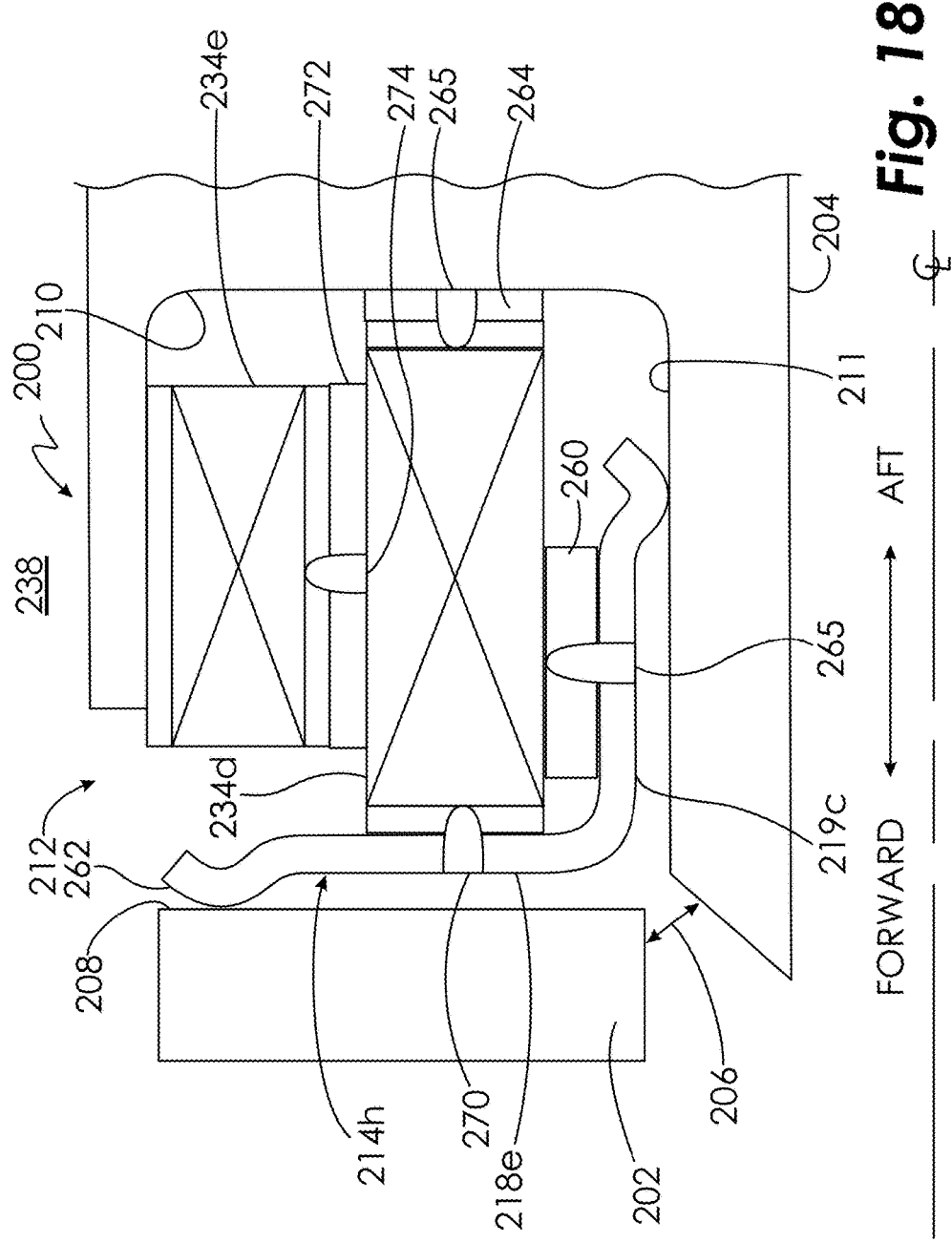
FIG. 18 is a schematic cross-sectional view of a seal and seal cavity in an embodiment.
Figure 19:
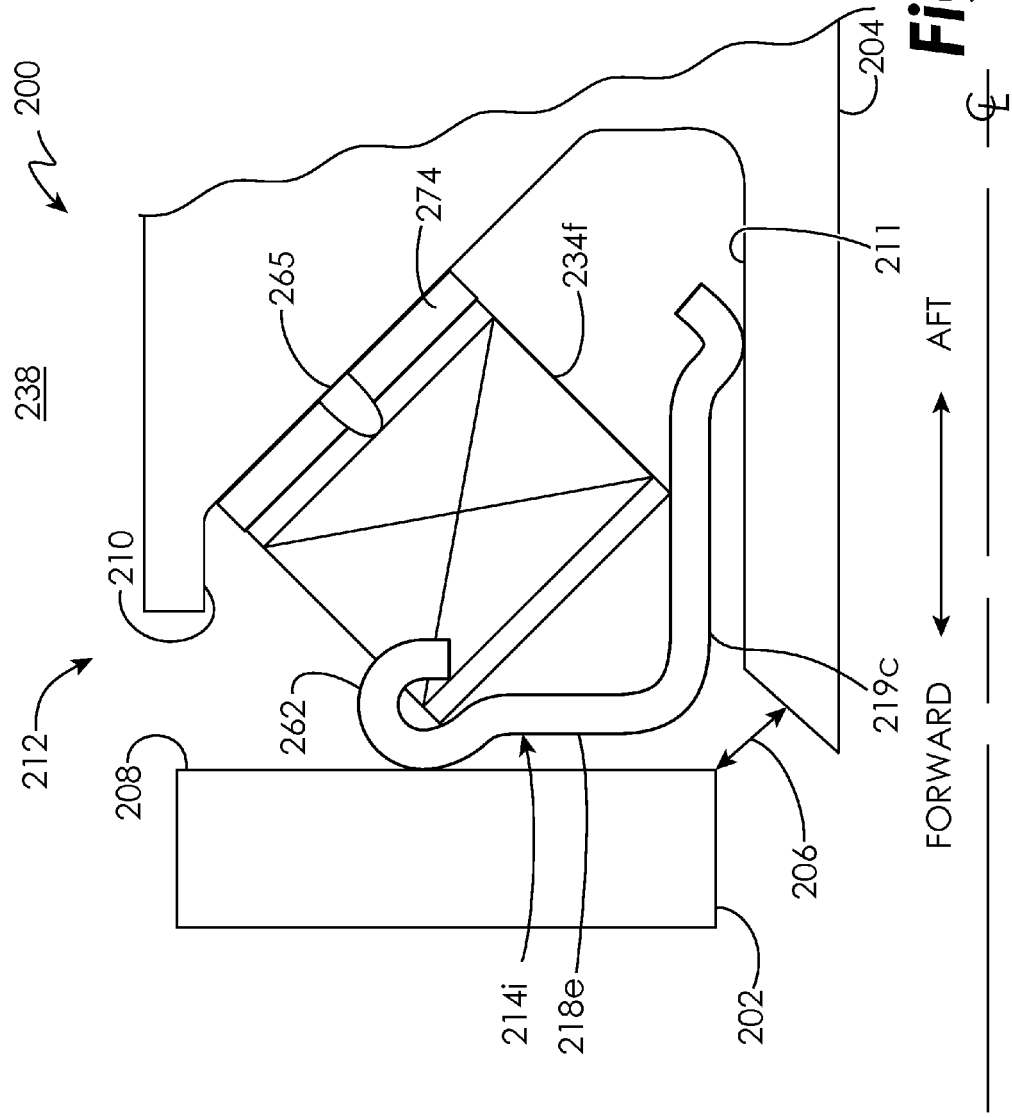
FIG. 19 is a schematic cross-sectional view of a seal and seal cavity in an embodiment.

In the embodiment of FIG. 18, the tabs 262 may optionally be omitted and the seal section 214h may optionally be bonded to the wave spring 234d at a location 270 by any desired means, such as by laser welds or resistance welds to name just two non-limiting examples. The seal may be loaded in the radial direction by a second wave spring 234e. The wave spring 234e may be bonded to a spacer 272 by any desired means, such as by laser welds or resistance welds to name just two non-limiting examples. The wave spring 234e is disposed radially outboard from the wave spring 234d and biases the wave spring 234d and seal section 214h radially inward by bearing against the component 204. In the embodiment of FIG. 19, a single angled wave spring 234f is disposed between the seal section 214i and the component 204 in order to apply both axial and radial loading to the seal section 214i. A frustoconical spacer 274 may be disposed between the wave spring 234f and the component 204 in some embodiments.

Compared to the seal 108, the wave spring 234 exhibits improved resilience within the same design space since the wave spring 234 can be configured to have a much lower spring rate. The seal sections 214, 216 are not deflected as the components 202 and 204 move relative to each other during engine assembly and engine operation, which is beneficial because the seal sections 214, 216 can be made from a lower strength and thicker, more lubricious sheet material that may be lower cost, have higher temperature capability, be more manufacturable, and/or more wear-resistant. Furthermore, the wave spring 234 is shielded from high conductive heat load, as well as convective and radiative heat loads from the gas path, by the seal sections 214, 216. The seal 212 offers potentially improved sealing where a compliant material is used against segmented parts. Additionally, the seal 212 is less susceptible to distortion or breakage, which can cause leakage of gas past the seal 212 and/or liberation of the seal. Furthermore, the seal 212 exhibits improved vibration tolerance due to friction damping.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal for sealing a space defined by first and second adjacent components disposed about an axial centerline, the seal comprising:
    a seal section having a base extending radially with respect to the axial centerline and an inboard leg extending axially from the base;
    a spacer disposed on the inboard leg;
    a wave spring disposed on the spacer, the spacer radially lifting the wave spring from the inboard leg, wherein the wave spring is retained by a plurality of tabs disposed around a circumference of the seal section, wherein the plurality of tabs wrap around a radial end surface of the wave spring and wherein the radial end surface of the wave spring is disposed further away from the spacer; and
    a shield contacting the wave spring axially opposite of the base of the seal section.

2. The seal as in claim 1, wherein the spacer is boned to the inboard leg at a plurality of circumferential locations.

3. The seal as in claim 1, wherein the spacer is boned to the inboard leg at a plurality of circumferential locations by laser welds or resistance welds.

4. The seal as in claim 1, wherein the shield is bonded to the wave spring.

5. The seal as in claim 4, wherein the shield is boned to the wave spring by a laser weld or a resistance weld.

6. The seal as in claim 5, wherein the laser weld or the resistance weld is located such that the wave spring and the shield may grow freely relative to one another in a circumferential direction.

7. The seal as in claim 1, wherein the shield is formed from a high-temperature and lubricious material to provide wear protection to the wave spring.

8. The seal as in claim 1, wherein the shield a thermal shield.

9. The seal as in claim 1, wherein the spacer is boned to the inboard leg at a plurality of circumferential locations and wherein the shield is bonded to the wave spring.

10. The seal as in claim 4, wherein the shield is boned to the wave spring by a laser weld or a resistance weld and wherein the laser weld or the resistance weld is located such that the wave spring and the shield may grow freely relative to one another in a circumferential direction.

11. The seal as in claim 10, wherein the shield is formed from a high-temperature and lubricious material to provide wear protection to the wave spring.

12. A system, comprising:
    a first component including a first surface;
    a second component including a second surface, the second component disposed adjacent the first component and defining a seal cavity therebetween, wherein the first and second components are disposed about an axial centerline; and
    a seal disposed in the seal cavity, the seal including:
    a seal section in contact with the first component and the second component, the seal section having a base extending radially with respect to the axial centerline and an inboard leg extending axially from the base;
    a spacer disposed on the inboard leg;
    a wave spring disposed on the spacer, the spacer radially lifting the wave spring from the inboard leg, wherein the wave spring is retained by a plurality of tabs disposed around a circumference of the seal section, wherein the plurality of tabs wrap around a radial end surface of the wave spring and wherein the radial end surface of the wave spring is disposed further away from the spacer; and
    a shield contacting the wave spring axially opposite of the base of the seal section.

13. The system as in claim 12, wherein the spacer is boned to the inboard leg at a plurality of circumferential locations.

14. The system as in claim 12, wherein the spacer is boned to the inboard leg at a plurality of circumferential locations by laser welds or resistance welds.

15. The system as in claim 12, wherein the shield is bonded to the wave spring.

16. The system as in claim 15, wherein the shield is boned to the wave spring by a laser weld or a resistance weld.

17. The system as in claim 16, wherein the laser weld or the resistance weld is located such that the wave spring and the shield may grow freely relative to one another in a circumferential direction.

18. The system as in claim 12, wherein the shield is formed from a high-temperature and lubricious material to provide wear protection to the wave spring.

19. The system as in claim 12, wherein the spacer is boned to the inboard leg at a plurality of circumferential locations and wherein the shield is bonded to the wave spring.

20. A method of sealing a seal cavity between a first component and a second component of a gas turbine engine, wherein the first and second components are disposed about an axial centerline of the gas turbine engine, the method comprising:
- contacting a first surface of the first component with a seal section of a seal disposed in the seal cavity;
- contacting a second surface of the second component with the seal section of the seal, wherein the seal section has a base extending radially with respect to the axial centerline and an inboard leg extending axially from the base;
- bonding a spacer to the inboard leg;
- locating a wave spring on the spacer;
- radially lifting the wave spring with the spacer from the inboard leg with the spacer;
- retaining the wave spring with a plurality of tabs disposed around a circumference of the seal section, wherein the plurality of tabs wrap around a radial end surface of the wave spring and wherein the radial end surface of the wave spring is disposed further away from the spacer; and
- contacting the wave spring with a shield axially opposite of the base of the seal section.

\* \* \* \* \*